United States Patent

Osanai

(10) Patent No.: US 8,180,561 B2
(45) Date of Patent: May 15, 2012

(54) VEHICLE-INSTALLATION OBSTACLE DETECTION APPARATUS

(75) Inventor: Satoshi Osanai, Oobu (JP)

(73) Assignee: Denso Corporation, Kariya (JP)

( * ) Notice: Subject to any disclaimer, the term of this patent is extended or adjusted under 35 U.S.C. 154(b) by 517 days.

(21) Appl. No.: 12/381,750

(22) Filed: Mar. 16, 2009

(65) Prior Publication Data

US 2009/0240432 A1  Sep. 24, 2009

(30) Foreign Application Priority Data

Mar. 18, 2008  (JP) .................................. 2008-069956

(51) Int. Cl.
*G01C 21/32* (2006.01)
*G06F 19/00* (2011.01)

(52) U.S. Cl. .......................... 701/200; 701/201; 701/204

(58) Field of Classification Search .................... 701/2, 3
See application file for complete search history.

(56) References Cited

U.S. PATENT DOCUMENTS

| | | | |
|---|---|---|---|
| 6,903,677 B2 * | 6/2005 | Takashima et al. | 342/70 |
| 2004/0056950 A1 * | 3/2004 | Takeda | 348/92 |
| 2005/0036660 A1 * | 2/2005 | Otsuka et al. | 382/104 |
| 2005/0231340 A1 * | 10/2005 | Tauchi | 340/435 |
| 2007/0021904 A1 | 1/2007 | Kawamata et al. | |
| 2007/0279250 A1 | 12/2007 | Kume et al. | |
| 2008/0189040 A1 * | 8/2008 | Nasu et al. | 701/301 |
| 2008/0278577 A1 | 11/2008 | Otsuka et al. | |

FOREIGN PATENT DOCUMENTS

| | | |
|---|---|---|
| JP | 08-167092 | 6/1996 |
| JP | 10-062162 | 3/1998 |
| JP | 11-203458 | 7/1999 |
| JP | 2000-242898 | 9/2000 |
| JP | 2005-047316 | 2/2005 |
| JP | 2005-092861 | 4/2005 |
| JP | 2005-258941 | 9/2005 |
| JP | 2005-327250 | 11/2005 |
| JP | 2006-284195 | 10/2006 |
| JP | 2007-034477 | 2/2007 |
| JP | 2007-323556 | 12/2007 |

OTHER PUBLICATIONS

Office Action dated Feb. 15, 2011 in corresponding Japanese Application No. 2008-069956.
Office Action dated Mar. 30, 2010 in Japanese Application No. 2008-069956 with English translation thereof.
Office Action dated Sep. 21, 2010 in Japanese Application No. 2008-069956 with English translation thereof.

* cited by examiner

*Primary Examiner* — Vivek Koppikar
*Assistant Examiner* — Trang Nguyen
(74) *Attorney, Agent, or Firm* — Harness, Dickey & Pierce, PLC

(57) ABSTRACT

A vehicle-installed obstacle detection apparatus includes a forward-view camera, and processes resultant image data to detect objects as possible obstacles. A size value such as tail lamp spacing, transmitted from a preceding vehicle, and a corresponding size value as measured in a captured image, are used to calculate the distance of the preceding vehicle. This is used together with a height value transmitted from the preceding vehicle and a corresponding height value measured in the captured image, to calculate the relative height difference between the vehicles, which is then used to discriminate between detected objects which are actual obstacles and objects such as road surface markers.

7 Claims, 4 Drawing Sheets

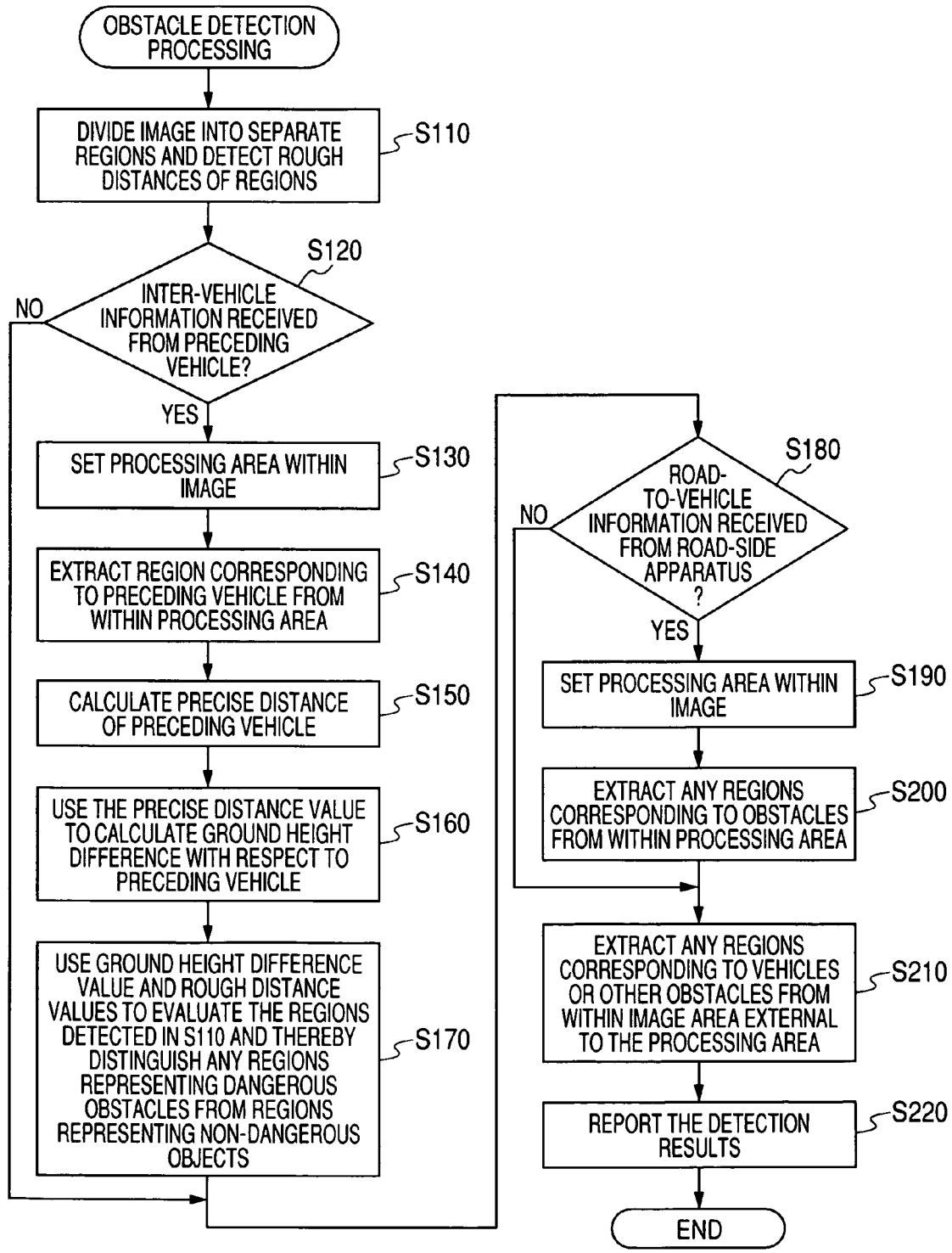

VEHICLE-INSTALLATION OBSTACLE DETECTION APPARATUS

CROSS-REFERENCE TO RELATED APPLICATIONS

This application is based on and incorporates herein by reference Japanese Patent Application No. 2008-069956 filed on Mar. 18, 2008.

BACKGROUND OF THE INVENTION

1. Field of Application

The present invention relates to an apparatus installed on a vehicle (referred to in the following as the local vehicle) for detecting obstacles based upon the contents of captured images of a region ahead of the vehicle.

2. Related Technology

Technology is known whereby images captured as data by an electronic camera installed on a vehicle can be processed to detect the presence of a preceding vehicle or a fixed obstacle that is located ahead of the local vehicle. Such an apparatus may also be used to detect the traffic lane in which the local vehicle is running, i.e., by detecting lane markers on the road surface. Technology is also known whereby information concerning the positions of obstacles (such as other vehicles) and concerning the condition of the road (e.g., extent of curvature, slope angle, etc.) can be acquired through communication with other vehicles (this being referred to as inter-vehicle communication in the following) or with equipment that is located beside the road along which the local vehicle is travelling, and which is configured to generate and transmit such information (referred to in the following as road-to-vehicle communication).

Such acquired information can be used to define a limited-size region within a captured image obtained by the camera of the local vehicle (i.e., as a region likely to contain objects that are to be detected). By applying image processing to such a limited region, the accuracy of detection can be increased, and the processing load reduced. The above technology is described for example in Japanese patent publications No. 8-167092, and 2007-34477.

However such technology enables only a reduction of the amount of image processing required, and an increase in reliability of detecting the presence of obstacles, or detecting lane markers on the road surface, etc., and an increase in the detection speed. However in order to control a vehicle to avoid collisions with preceding vehicles, etc., and ensure safety in the event that a collision occurs, it is essential to acquire precise real-time distance and relative position information concerning obstacles that are located ahead of the local vehicle. Until now it has been necessary to utilize some separate apparatus, such as a radar apparatus, to achieve such precise measurement of positions and distances.

Another problem is that when there is a slope in the road surface ahead of the local vehicle, it becomes difficult to accurately identify obstacles (i.e., distinguish dangerous obstacles from other objects) based upon the contents of captured images. This will be described referring first to the example shown in FIG. 4(a). Here, a road surface 10 has a horizontal portion which is succeeded by an upwardly-sloping portion 11 as shown, with a road surface marker 13 (e.g., lane marker) located on the upwardly-sloping portion 11. As can be understood from FIG. 4(b), when an image containing the marker 13 is captured along the direction indicated by the arrow, i.e., by a camera of a vehicle situated on the road surface portion 10, it will not be possible to determine whether a region in the image that represents the marker 13 actually represents such a 2-dimensional object, or represents a 3-dimensional object 14 (i.e., an actual obstacle). Similarly in the example of FIG. 4(c), the road surface has a downwardly-sloping portion 12, on which an actual obstacle 15 (3-dimensional object) is located as shown. In this case, as illustrated by FIG. 4(d), it will not be possible to determine (based on image processing) whether a region in an image which represents the obstacle 15 actually represents such a 3-dimensional object, or a non-dangerous object 16 such as a road surface marker. It can thus be understood that if obstacle detection is performed simply based upon shapes and positions of regions within a captured image, reliable discrimination between actual obstacles and road surface markers, etc., cannot be achieved.

SUMMARY OF THE INVENTION

It is an objective of the present invention to overcome the above problems, by providing an obstacle detection apparatus to be installed on a vehicle, whereby enhanced accuracy can be achieved in detecting the position relationship between that vehicle and an obstacle, through use of road-to-vehicle information obtained from a roadside apparatus and/or inter-vehicle information obtained from a preceding vehicle.

It is a further objective to provide such an obstacle detection apparatus, whereby reliable discrimination can be achieved between detected objects which present a danger of collision and detected objects (e.g., 2-dimensional markers on a road surface, etc.) which do not present such a danger.

To achieve the above objectives, from a first aspect, the invention enables accurate calculation of the distance of a specific obstacle, such as a preceding vehicle which is located ahead of the vehicle on which the obstacle detection apparatus is installed. Specifically, such an obstacle detection apparatus includes an electronic camera (e.g., video camera) positioned to capture images of the scene ahead of the vehicle, and image processing circuitry configured for processing data produced by the camera, expressing each captured image, for detecting objects which may constitute obstacles located ahead of the vehicle. The apparatus also includes a memory (e.g., ROM) which has image parameter information specific to the camera stored therein beforehand (such as focal length, and position of extinction point in the image plane). The obstacle detection apparatus further comprises communication circuitry, information generating circuitry, information acquisition circuitry, and distance calculation circuitry.

The communication circuitry executes inter-vehicle communication with a preceding vehicle for receiving size information concerning the preceding vehicle, and/or road-to-vehicle communication with an apparatus installed at the roadside and which transmits information indicative of positions, shapes, etc, of fixed obstacles in the road, and positions and shapes of areas requiring special caution such as pedestrian crossings. The information generating circuitry derives captured image size information, expressing a size dimension (e.g., width) of an object that is detected by the image processing circuitry, with the size value being as measured in the image plane of the camera. The information acquisition circuitry serves to acquire (through the communication circuitry) information expressing an actual size dimension of a specific obstacle located ahead of the vehicle. The distance calculation circuitry accurately calculates the distance from the vehicle to the specific obstacle, with the calculation being performed based upon the size dimension value as measured in a captured image, the actual size dimension value, and the image parameter information.

When the specific obstacle is a preceding vehicle, the size dimension may be determined as the distance between two tail lamps of a preceding vehicle.

The information acquisition circuitry may be configured to also acquire above-ground height information relating to the specific obstacle, in conjunction with the actual size dimension information, where the above-ground height information expresses the actual height of a target object (e.g., pair of tail lamps) above the road surface. In that case, the obstacle detection apparatus also comprises ground height difference calculation circuitry for calculating a ground height difference value for the specific obstacle. Here, the "ground height difference" is the difference in elevation between the road surface on which the local vehicle is situated and the road surface on which the specific obstacle is situated. The calculation is performed based upon the aforementioned calculated accurate distance of the specific obstacle, the above-ground height information obtained by the information acquisition circuitry, and the image parameter information.

Hence, since it becomes possible to accurately obtain the ground height difference between the road surface on which the local vehicle is running and the road surface at a specific distance ahead of the local vehicle, it becomes possible to provide the apparatus with discrimination circuitry for judging judge whether objects detected in a captured image (i.e., as separate regions within the image) constitute actual obstacles having significant height, or are for example 2-dimensional markers formed on the road surface. Thus the problem described hereinabove referring to FIGS. 4(a) to 4(d) can be effectively overcome.

From another aspect, the information acquisition circuitry may be configured to also acquire position information concerning a specific obstacle, e.g., through inter-vehicle communication or road-to-vehicle communication as described above. In that case the image processing circuitry may be configured to delimit a specific area within a captured image as an image processing area, based upon the position information, and to perform object detection by processing of data corresponding to the image processing area. The image processing load can thereby be reduced.

With the present invention, accurate and reliable detection of the distance to a dangerous obstacle such as a preceding vehicle can be achieved without requiring the use of radar detection or other forms of accurate distance detection apparatus. In addition, reliable discrimination between dangerous obstacles and non-dangerous detected obstacles (such as road surface markers) can be achieved, through use of the calculated difference in elevation between the road surface on which the local vehicle is situated and a part of the road surface at a specific distance ahead of that vehicle. Moreover since detected objects which actually do not present a collision danger can be eliminated from consideration, unnecessary processing of data obtained from captured images can be reduced.

BRIEF DESCRIPTION OF THE DRAWINGS

FIG. 2 is a flow diagram of obstacle detection processing that is executed by an image processing and calculation section of the embodiment;

DESCRIPTION OF PREFERRED EMBODIMENTS

Before describing a specific configuration of an embodiment of an obstacle detection apparatus, basic principles employed by such an apparatus will be summarized. Referring to the example shown in FIG. 3(a), a size dimension (e.g., width) of an object which is detected, as measured in a captured image obtained by the camera of a vehicle-installed obstacle detection apparatus is designated as Ls. Specifically, when Ls is measured as a number of picture elements in an image, the equivalent number of pixels of the camera image sensor is multiplied by the pixel size, to obtain the value of Ls. The corresponding actual size dimension of the target object (e.g., acquired through inter-vehicle communication) is designated as Lt. The focal length of the camera is designated as f (i.e., a value which is held stored as an image parameter, by the obstacle detection apparatus). The distance from the camera to the target object (i.e., distance from the local vehicle to the target object) is designated as D, which is calculated using equation (1) below:

$$D = f \times (Lt/Ls) \tag{1}$$

Hence, by acquiring information expressing an actual size dimension of a specific obstacle, e.g., through inter-vehicle communication, and using that information in conjunction with corresponding size dimension information obtained from a captured image, it becomes possible to accurately obtain the distance D from the local vehicle to the obstacle, without requiring the use of a separate apparatus for accurate distance measurement, such as a radar apparatus.

When the detected obstacle is a preceding vehicle, the size dimension is preferably the distance between two tail lamps of that vehicle.

The information that is acquired concerning a specific obstacle such as a preceding vehicle preferably also includes the height (above the ground surface) of a target object situated on the specific obstacle, i.e., when the target object is a pair of tail lamps of a preceding vehicle, the height value is the above-ground height of the tail lamps. In that case, it becomes possible to accurately calculate the ground height difference between the local vehicle and an obstacle located ahead of that vehicle.

Figure 3A:
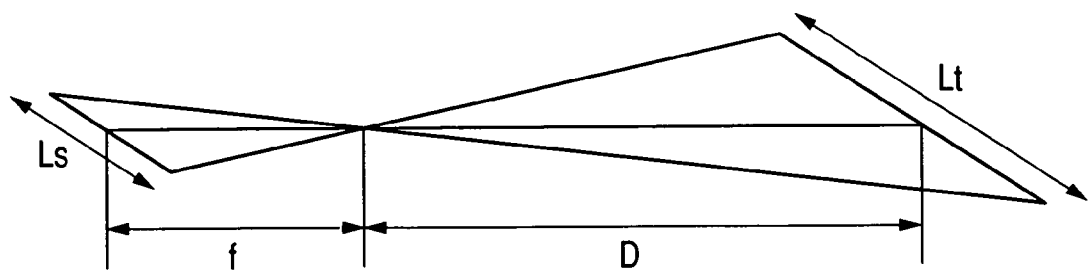
FIGS. 3(a), 3(b) show diagrams illustrating principles which are used to calculate accurate values of distance and above-ground height of a preceding vehicle, with the embodiment.
Figure 3B:
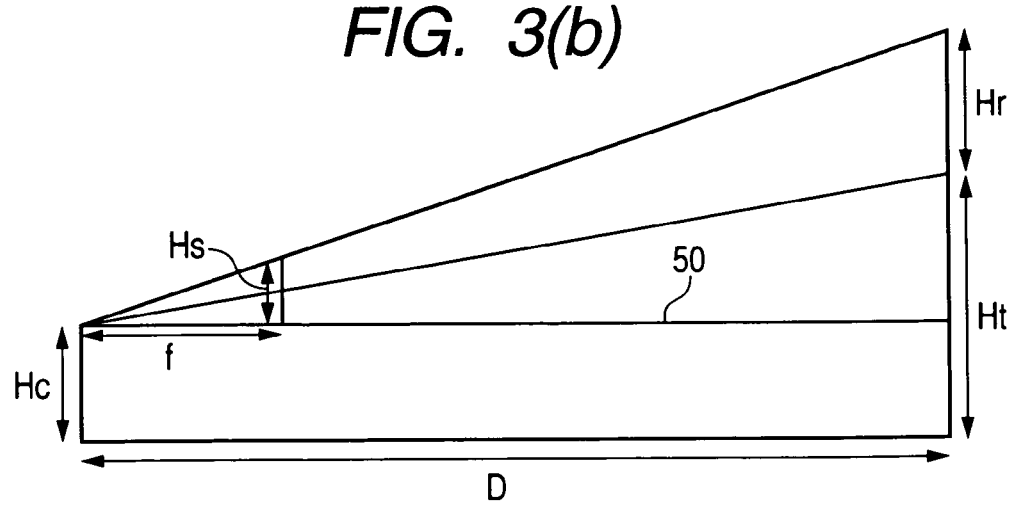

Specifically as illustrated in FIG. 3(b), assuming that the distance D to a specific obstacle has been accurately calculated using equation (1) above, then designating the above-ground height of the camera of the local vehicle as Hs, the actual above-ground height of a target object on the specific obstacle as Ht (e.g., acquired as inter-vehicle information), and designating the target object height as measured in the image plane of the camera as Hs (i.e., measured as for Ls described above) and f as the camera focal length, the ground height difference Hr can be calculated from the following equation (2):

$$Hr = Hc - Ht + D \times (Hs/f) \tag{2}$$

Hs is measured as the vertical distance between the target object and a horizontal line in the image plane which passes through the extinction point of the image. The term "extinction point", as used herein, signifies a position in the image plane at which straight lines which extend without limit ahead of the camera would appear to converge to a single point. In the example of FIGS. 3(a), 3(b) and the calculation of equation (2), it is assumed that the camera optical axis is oriented parallel to the road surface on which the local vehicle is situated, i.e., is oriented along a line 50 which passes through the extinction point.

Figure 4A:
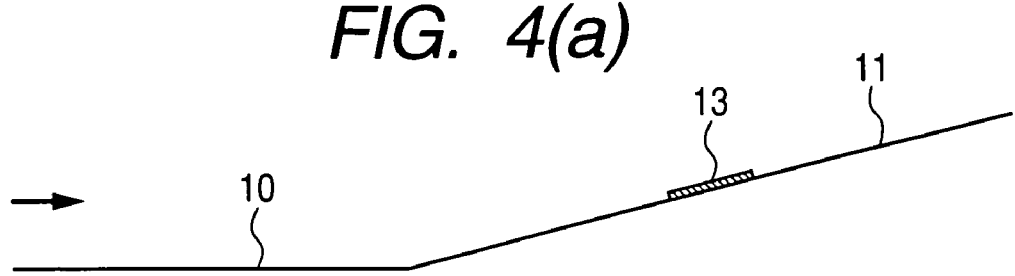
FIGS. 4(a) to 4(d) show diagrams which illustrate problems which arise in obstacle detection, when there is a difference in height between a road surface on which an obstacle detection apparatus is situated and a road surface on which a detected object is situated.
Figure 4B:
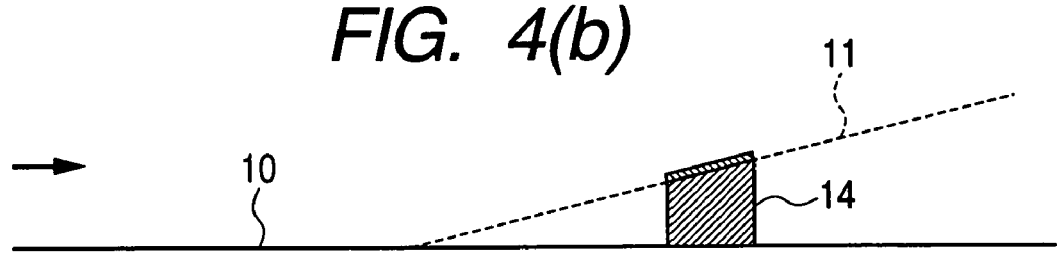
Figure 4C:
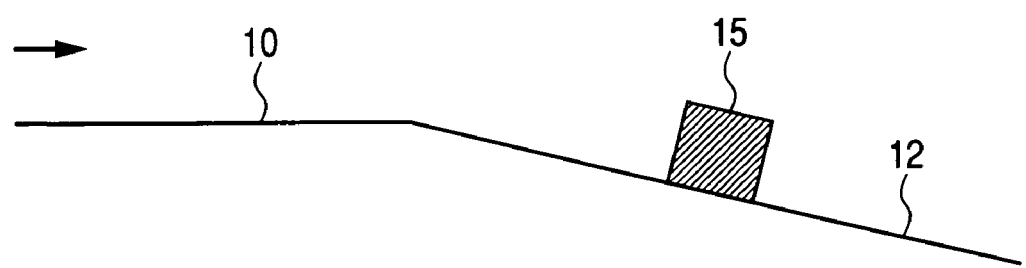
Figure 4D:
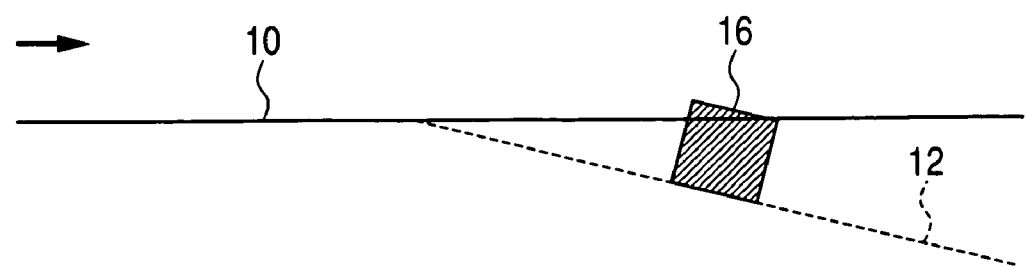

By calculating such ground height difference information, the obstacle detection apparatus can be configured to discriminate between an object detected in a captured image which does not present a danger of collision, such as a marker formed on the road surface as in the example of FIG. 4(a) above, and an object which actually does present such a danger, as in the example of FIG. 4(c).

Figure 1:
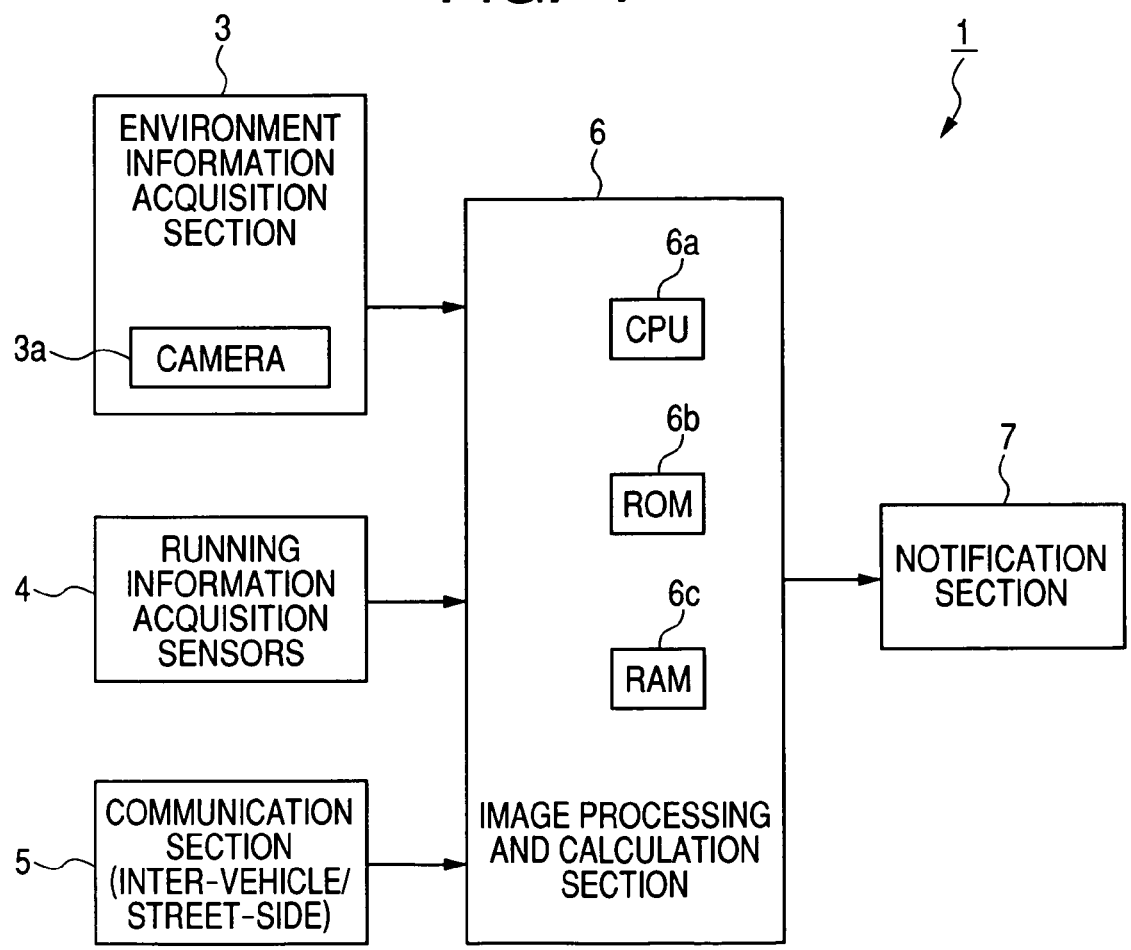
FIG. 1 is a block diagram showing the overall configuration of an embodiment of an obstacle detection apparatus which is installed in a vehicle.

The general configuration of an embodiment of a vehicle-installed obstacle detection apparatus 1 is shown in block diagram form in FIG. 1. The obstacle detection apparatus 1 includes environment information acquisition sensors 3, running information acquisition sensors 4, a communication section 5, an image processing and calculation section 6 and a notification section 7. The environment information acquisition sensors 3 serve to capture information concerning the external environment of the local vehicle, and include a forward-view camera 3a (i.e. an electronic camera such as a video camera) which is configured and oriented for capturing successive images of the scene ahead of the local vehicle, as respective sets of digital data. The running information acquisition sensors 4 obtain information concerning the running conditions of the local vehicle, including at least the current location of that vehicle, and includes a vehicle speed sensor, yaw rate sensor, steering angle sensor, GPS (Global Positioning System) receiver, etc. The communication section 5 includes various types of communication apparatus for wireless communication with vehicles which respectively precede and follow the local vehicle (inter-vehicle communication) and roadside apparatuses which may be fixedly located beside a road along which the local vehicle is being driven (road-to-vehicle communication).

The image processing and calculation section 6 performs image processing for detecting obstacles located ahead of the local vehicle and performs calculations for generating information concerning such obstacles, based upon environmental condition information obtained by the environment information acquisition sensors 3, driving condition information obtained by the running information acquisition sensors 4, and externally obtained information that is acquired by the communication section 5 (including at least inter-vehicle information that is acquired through communication with a preceding vehicle). The notification section 7 transfers the captured images and the processing results obtained by the image processing and calculation section 6 to other equipment of the vehicle (not shown in the drawings), for use in vehicle control, generating warning indications, and image display purposes.

Communication Section

The communication section 5 performs inter-vehicle communication with a preceding vehicle, to receive information (e.g., position, size dimension, above-ground height) concerning the preceding vehicle, transmitted by that vehicle. The communication section 5 also perform inter-vehicle communication for transmitting similar information, concerning the local vehicle, to a following vehicle. The information thus transmitted includes at least the location of the transmitting vehicle, and vehicle-specific information such as the distance between the tail lamps, and height information (e.g., above-ground height of the tail lamps) of the transmitting vehicle, and may also indicate the type (e.g., truck, private automobile, etc.) or shape of that vehicle.

The communication section 5 is also configured to receive road-to-vehicle information from any roadside apparatus that may be located adjacent to the road on which the local vehicle is travelling and which transmits such information. The road-to-vehicle information thus acquired may relate to fixed obstacles, or may relate to areas which require particular caution by the vehicle driver and which are referred to in the following as "precaution areas", such as a pedestrian crossing (where there may be "mobile obstacles" consisting of pedestrians or bicycles). The acquired information may consist of the location, the size (e.g., size dimension), shape, etc., of such a fixed obstacle or precaution area.

The notification section 7 is configured to transfer the processing results obtained by the image processing and calculation section 6, and captured images, to other equipment of the vehicle, which thereby provide visible and audible warning indications to the vehicle driver based on the processing results.

The image processing and calculation section 6 of this embodiment is a microcomputer based on a CPU 6a, a ROM 6b and RAM 6c, together with an A/D converter, digital signal processor, etc., (not shown in the drawings). The ROM 6b has stored therein at least a control program for executing processing by the CPU 6, information that is specific to the local vehicle (i.e., the aforementioned inter-vehicle information which is transmitted by the communication section 5 to a following vehicle), and image parameters. The image parameter information includes at least the focal length of the forward-view camera 3a, the above-ground height of the forward-view camera 3a, and the position of the extinction point within the image plane.

The CPU 6 executes a processing sequence for detecting actual obstacle and road surface markers, etc., based on a captured image obtained from the forward-view camera 3a and externally acquired information when available, as described in the following referring to the flow diagram of FIG. 2.

Processing

Firstly (step S110), the captured image (i.e., array of digital values expressing respective picture elements) is analyzed, to be divided into respective regions assumed to represent respective objects, some of which may be actual obstacles located ahead of the local vehicle. A known type of image processing is then applied to the image, for estimated respective distance values corresponding to these image regions (detected objects). These estimated distance values will be referred to in the following as "rough distances".

Next (step S120) a decision is made as to whether inter-vehicle information has been newly acquired from a preceding vehicle by the communication section 5. If so, operation proceeds to step S130, while if no inter-vehicle information has been received, step S180 is then executed.

In step S130, a limited-extent area within the captured image is defined, as an area for which detailed processing is to be applied. This limited-extent area is determined based on the contents of the received inter-vehicle information, i.e., information which indicates that there is a target object consisting of a preceding vehicle, and information concerning that vehicle, including its current location. Next in step S140, a region representing the preceding vehicle is extracted, from within the limited-extent area defined in the captured image. Specifically, when the received inter-vehicle information includes information expressing the shape of the preceding vehicle, a template is generated corresponding to that shape and template matching is performed to extract the preceding vehicle from the captured image.

Next (assuming that a pair of tail lamps of the preceding vehicle are to be detected as a target object, as described hereinabove, and that the received inter-vehicle information specifies the actual distance Lt between these tail lamps and the actual above-ground height Ht of the tail lamps, as described above referring to FIGS. 3(a), 3(b)), the apparent target object size dimension Ls (distance between the tail lamps) and apparent target (apparent above-ground height of the tail lamps) as measured in the captured image, are respectively obtained, based on contents of the aforementioned limited processing region within the captured image. The value of Hs is obtained in relation to the extinction point position in the image plane, as described above referring to FIG. 3(b).

Next in step S150, based on the size dimension Ls obtained in step S140 and the focal length f (read out as an image parameter from the ROM 6b) are used to calculate the distance D to the preceding vehicle. Such a calculated value D will be referred to as a precise distance.

Step S160 is then executed in which, based on the height value Hs obtained in step S140, the precise distance D calculated in step S150, the actual above-ground height Ht of the tail lamps of the preceding vehicle (acquired in the inter-vehicle information ), the focal length f (from the ROM 6b), and the above-ground height Hc of the camera 3a (also read out as an image parameter from the ROM 6b) are used in equation (2) above, to obtain the ground height difference Hr, i.e., the elevation difference between the road surface on which the local vehicle is situated and the road surface on which the preceding vehicle is situated (as described for FIG. 3(b) above).

The processing sequence of steps S130~S160 is executed each time that inter-vehicle information is acquired, i.e., is executed successively for each of one or more vehicles which are currently running ahead of the local vehicle and which are each transmitting inter-vehicle information.

Next in step S170, based on the ground height difference value Hr obtained in step S160 and the values of rough distance that have been respectively obtained for different objects (i.e., detected as respective image-regions) in step S110, respective above-ground height values are calculated for those detected obstacles which are within the processing area that was determined in step S140. The detected objects are thereby evaluated, to discriminate between those which are below a predetermined threshold value of above-ground height, and so are not actual obstacles (e.g., lane markers, etc., formed on the road surface) and objects which are above the threshold value of height, and so present a danger of collision.

Next (step S180) a decision is made as to whether road-to-vehicle information has been newly acquired, through road-to-vehicle communication. If such information has been acquired then step S190 is executed, while otherwise, operation proceeds to step S210. The road-to-vehicle information may specify the locations, size dimensions, etc., of one or more fixed obstacles, and/or one or more precautions area such as pedestrian crossings. In step S190, a limited-extent area within the captured image is defined, as a processing area. This is done based on the contents of the received road-to-vehicle information, i.e., based on the position and size of a fixed obstacle or a precaution area as indicated in the received information.

Next in step S200, any objects corresponding to fixed obstacles that are within the processing area determined in step S190, or objects corresponding to mobile obstacles (e.g., pedestrians, cyclists) within any precaution area (such as a pedestrian crossing) within the processing area, are extracted from the image. This is done by applying template matching to the image, using templates that are selected in accordance with the contents of the road-to-vehicle information. The positions and sizes of any fixed and/or mobile obstacles within the processing area are thereby obtained.

For example, if the road-to-vehicle information indicates a pedestrian crossing, then templates corresponding to pedestrians and to cyclists (i.e., mobile obstacles which have a high probability of being within such a precaution area) are selected to be used. The processing of steps S190~S200 is performed successively for each of respective fixed obstacles and precaution areas that are specified in the received road-to-vehicle information.

In step S210, image processing is performed to extract from the remaining image area, outside the processing areas determined in step S130 and S190, any objects corresponding to vehicles and/or fixed obstacles. Finally in step S220, the detection results obtained are notified to the notification section 7.

In relation to the appended claims, the processing of step S140 above corresponds to a function performed by information generating circuitry as recited in the claims, the processing of step S150 corresponds to a function performed by distance calculation circuitry, the processing of step S160 corresponds to a function performed by ground height difference calculation circuitry, and the processing of step S170 corresponds to a function performed by discrimination circuitry. It will be understood that although with the above embodiment these functions are performed through execution of a control program by a microcomputer, it would be equally possible to implement at least a part of the functions by dedicated hardware circuitry.

Results Obtained

As described above, the obstacle detection apparatus 1 uses equation (1) to calculate the precise distance D between the local vehicle and a preceding vehicle, based on inter-vehicle information that is transmitted from the preceding vehicle (specifically, an actual size dimension Lt of the preceding vehicle, e.g., distance between tail lamps), the corresponding size dimension value Ls as measured in a captured image obtained from the forward-view camera 3a, and the focal length f of the camera 3a (held stored as an image parameter). Such precise measurement of distance to a preceding vehicle is thereby achieved without requiring the use of a distance measurement apparatus such as a radar apparatus.

Furthermore since the obstacle detection apparatus 1 can obtain the size dimension value Lt as the distance between tail lamps of a preceding vehicle, accurate measurement of the distance D can be achieved even during night-time operation.

Moreover the obstacle detection apparatus 1 can accurately calculate the ground height difference Hr between the road surface on which the local vehicle is running and the road surface on which a preceding vehicle is running, using equation (2) above, based on the actual above-ground height Ht of the preceding vehicle (or the above-ground height of the vehicle tail lamps) which is transmitted as inter-vehicle information from the preceding vehicle, the corresponding height value Hs as measured in a captured image from the camera 3a, the focal length f and the above-ground height Hs of the camera 3a (held stored as respective image parameters), and the precise distance D to the preceding vehicle (calculated using equation (1)).

Based on that ground height difference Hr, the obstacle detection apparatus 1 can judge respective objects appearing in a captured image (i.e., detected objects, some of which may be obstacles), to discriminate between those objects which do not present a danger such as markers formed on the road surface, and 3-dimensional objects which are obstacles, i.e., present a danger of collision.

Increased reliability can thereby be achieved for performing control of the vehicle based upon results of such detection of external objects, or for providing warning indications to the vehicle driver based on the results of such detection. In addition, it becomes possible to eliminate unnecessary processing relating to these detected objects which do not present any danger, so that the overall processing load can be reduced.

It should be noted that the invention is not limited to the use of a pair of tail lamps of a preceding vehicle as a target object for use in precise distance calculation as described above. It would be equally possible to use a distance between some other two visibly distinct parts of a preceding vehicle or other object, i.e., parts which will appear in a captured image and are at a sufficient height above the road surface.

Other Embodiments

It should also be noted that the present invention is not limited to the embodiment described above, and that various alternative embodiments are possible.

For example, with the above embodiment, values of precise distance D and ground height difference Hr are determined for a preceding vehicle, based on inter-vehicle information that is acquired from that vehicle. However it would be equally possible to configure the apparatus to determine the precise distance D of a fixed obstacle (and if necessary, the ground height difference Hr with respect to the fixed obstacle), based on road-to-vehicle information (i.e., specifying the location, actual value of a size dimension, above-ground height, etc., of the fixed obstacle), transmitted from a roadside apparatus.

What is claimed is:

1. An obstacle detection apparatus comprising:
    an electronic camera installed on a detection vehicle, the electronic camera configured to capture an image of an external view ahead of said detection vehicle,
    image processing circuitry configured to process data produced by said camera, expressing said image, for detecting objects which may constitute obstacles located ahead of said detection vehicle,
    a memory having image parameter information specific to said camera stored therein,
    communication circuitry configured to perform at least one of two modes of communication, said modes comprising inter-vehicle communication between said detection vehicle and a preceding vehicle and road-to-vehicle communication between said detection vehicle and a roadside apparatus,
    information generating circuitry configured to derive size dimension information expressing a size dimension of an object detected by said image processing circuitry, as measured in an image plane of said camera;
    information acquisition circuitry configured to acquire, via said communication circuitry, actual size dimension information expressing an actual size dimension of a specific obstacle located ahead of said detection vehicle; and
    distance calculation circuitry configured to accurately calculate a value of distance between said specific obstacle and said detection vehicle, based upon said size dimension derived by said information generating circuitry, said actual size dimension, and said image parameter information; wherein
    said actual size dimension is a distance between a pair of objects which are located on said specific obstacle;
    said information acquisition circuitry is configured to acquire above-ground height information in conjunction with said actual size dimension information, said above-ground height information expressing an actual height value of said pair of objects above a road surface,
    said obstacle detection apparatus comprises ground height difference calculation circuitry configured to calculate a ground height difference value as a difference between a height of a road surface on which said detection vehicle is situated and a height of a road surface on which said specific obstacle is situated; and
    said calculation of said ground height difference being based upon said distance value calculated by said distance calculation circuitry, said above-ground height value obtained by said information acquisition circuitry, and said image parameter information.

2. An obstacle detection apparatus according to claim 1, comprising discrimination circuitry configured to judge each of respective objects that are detected by said image processing circuitry, with said judgment executed based upon said ground height difference value, for discriminating between objects which constitute actual obstacles and objects which do not constitute actual obstacles.

3. An obstacle detection apparatus according to claim 2, wherein said objects which do not constitute actual obstacles comprise markers formed upon a road surface.

4. An obstacle detection apparatus according to claim 1, wherein said specific obstacle is said preceding vehicle, and said pair of objects comprise a pair of tail lamps of said preceding vehicle.

5. An obstacle detection apparatus according to claim 1, wherein:
    said information acquisition circuitry is configured to acquire position information expressing a position of said specific obstacle, in conjunction with said actual size dimension information, and
    said image processing circuitry is configured to delimit a specific area with said image as an image processing area, based upon said position information, and to perform said object detection by processing of image data corresponding to said image processing area.

6. An obstacle detection apparatus according to claim 1, wherein the obstacle detection apparatus does not include a radar apparatus.

7. An obstacle detection apparatus according to claim 1, wherein the actual size dimension of the specific obstacle located ahead of the detection vehicle is transmitted from the specific object to the detection vehicle.

* * * * *